United States Patent [19]

Reast

[11] Patent Number: 5,217,248
[45] Date of Patent: Jun. 8, 1993

[54] VEHICLE SUSPENSION SYSTEM

[75] Inventor: John B. Reast, Bedford, England

[73] Assignee: Detroit Steel Products Co. Inc., Morristown, Ind.

[21] Appl. No.: 768,397

[22] PCT Filed: Mar. 21, 1990

[86] PCT No.: PCT/GB90/00436

§ 371 Date: Sep. 20, 1991

§ 102(e) Date: Sep. 20, 1991

[87] PCT Pub. No.: WO90/11201

PCT Pub. Date: Oct. 4, 1990

[30] Foreign Application Priority Data

Mar. 22, 1989 [GB] United Kingdom ............... 8906600

[51] Int. Cl.⁵ ................................................ B60G 11/02
[52] U.S. Cl. .................................. 280/718; 280/689; 280/712
[58] Field of Search ................ 280/711, 712, 718, 689

[56] References Cited

U.S. PATENT DOCUMENTS

| | | | |
|---|---|---|---|
| 4,097,034 | 6/1978 | Sweet et al. | 280/712 |
| 4,181,324 | 1/1980 | Hixon | 280/713 |
| 4,614,247 | 9/1986 | Sullivan | 280/712 |
| 4,664,407 | 5/1987 | Griffin, Sr. | 280/689 |
| 4,691,937 | 9/1987 | Raidel | 280/711 |
| 4,706,988 | 11/1987 | Young | 280/712 |

*Primary Examiner*—Kenneth R. Rice
*Attorney, Agent, or Firm*—John M. Cone; William L. Clayborn

[57] ABSTRACT

A suspension system for a vehicle wheel set, comprising first suspension means, second suspension means, and stabilizing means arranged generally transversely of the longitudinal axis of an associated vehicle and arranged to act in conjunction with at least one of said first and second suspension means, provide the vehicle with an anti-roll characteristic when operating under certain conditions. In a preferred embodiment, the first suspension means comprises a pair of leaf springs, and the second suspension means comprises a leaf spring, coil spring, hydraulic, pneumatic, or rubber (elastomeric) suspension arrangement, or any combination thereof, connected to an anti-roll bar or tube. Also provided is a composite stabilizing means in the form of an anti-roll bar or tube connected between a pair of leaf spring arms, preferably adjustable longitudinally thereof.

22 Claims, 10 Drawing Sheets

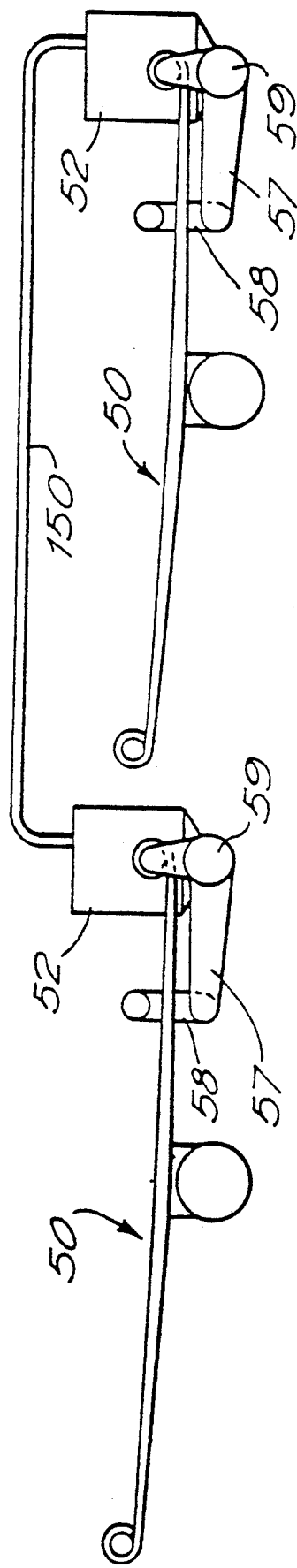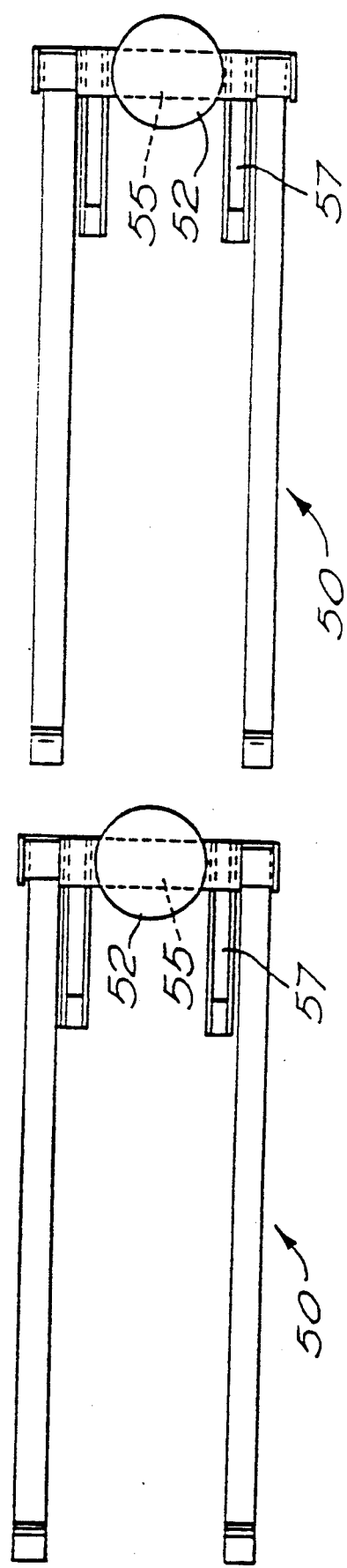
FIG.5A.
FIG.5B.

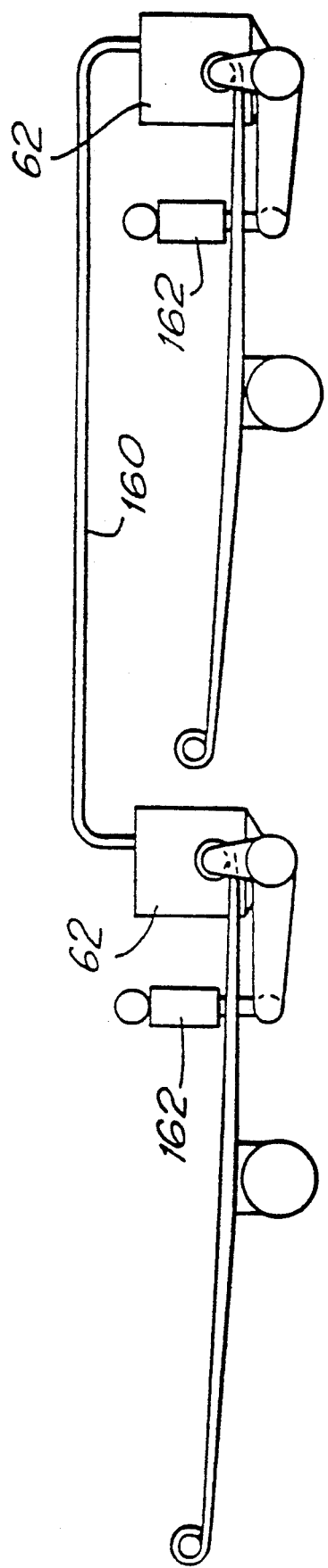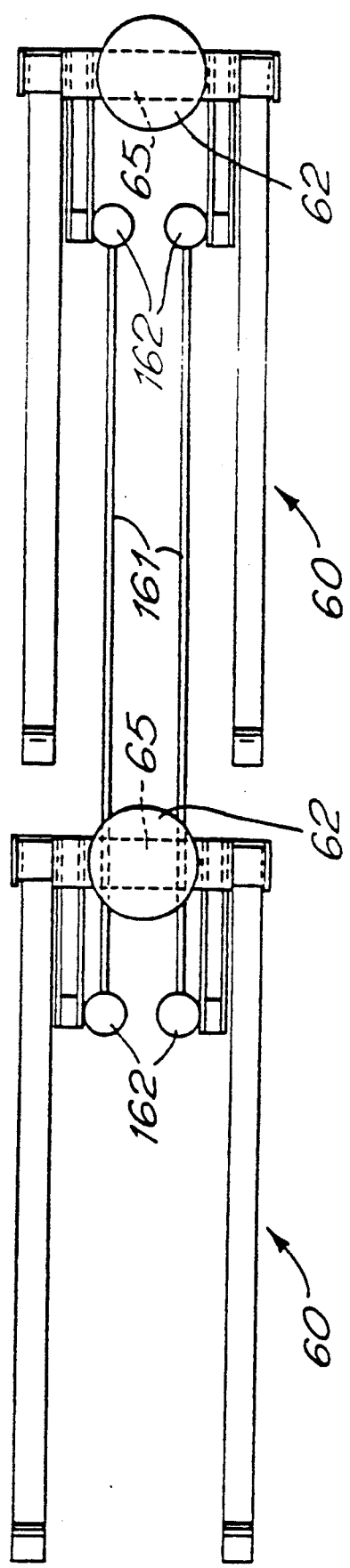
FIG.6A.
FIG.6B.

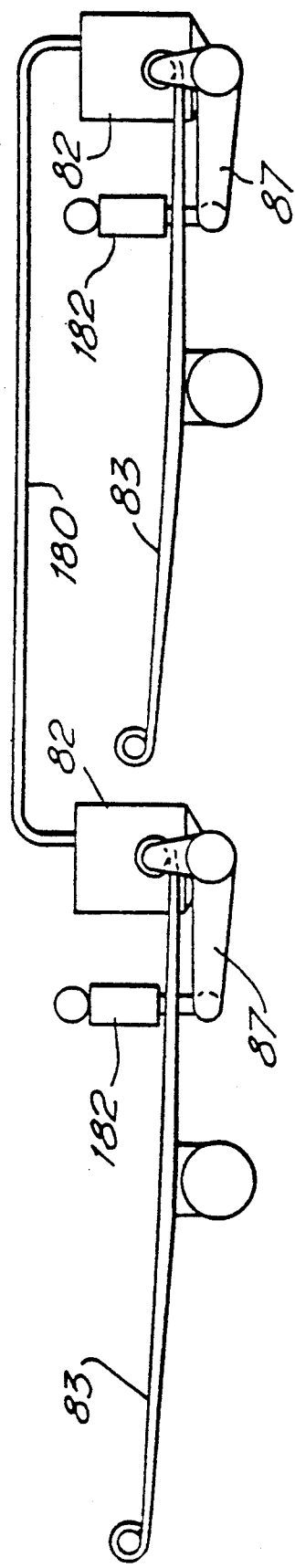
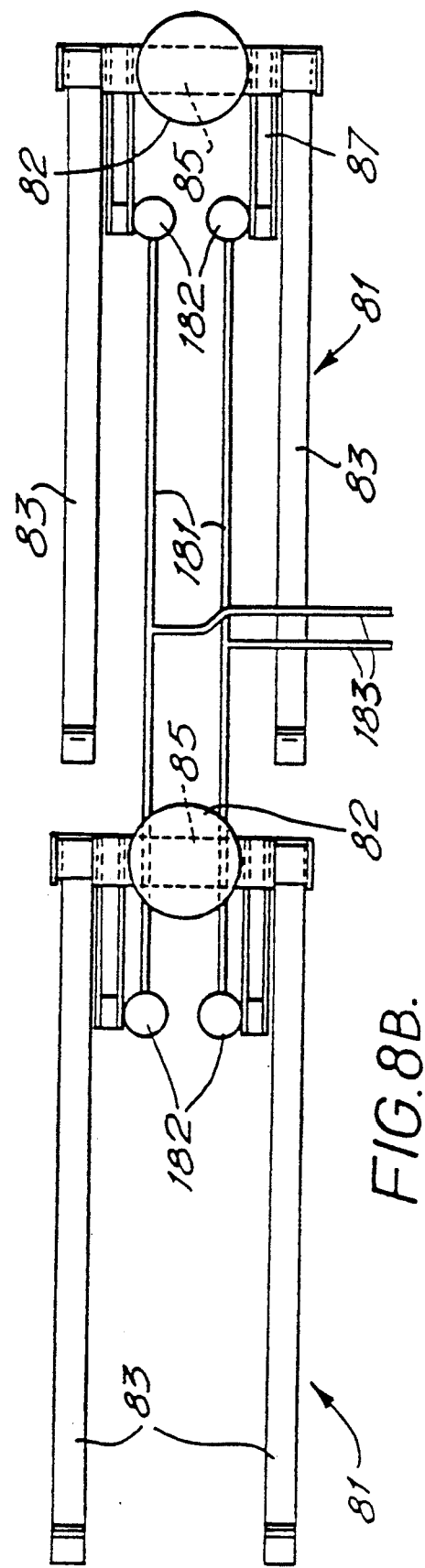

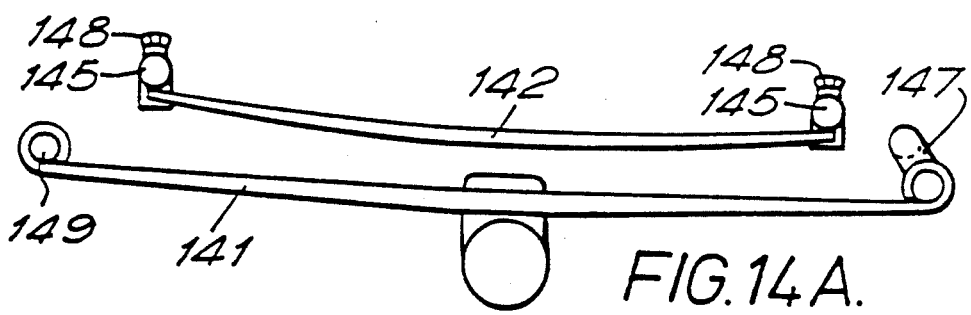
FIG. 14A.
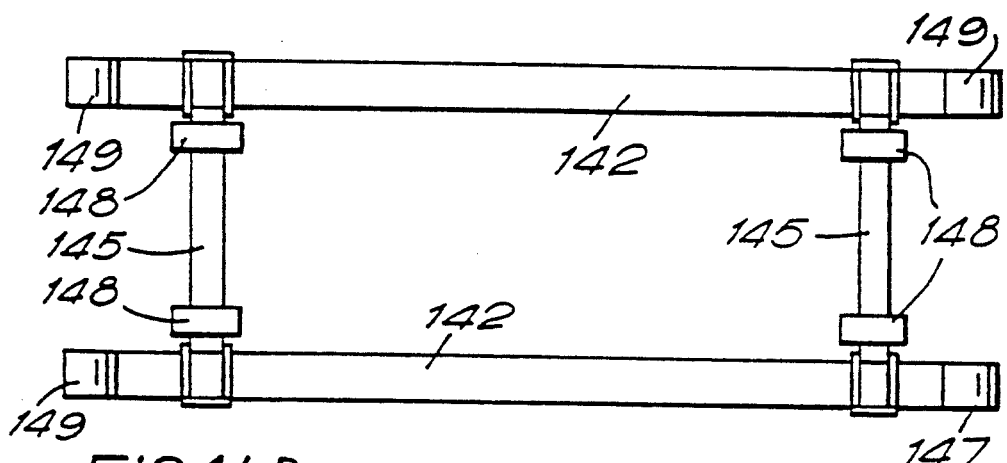
FIG. 14B.
FIG. 15A.
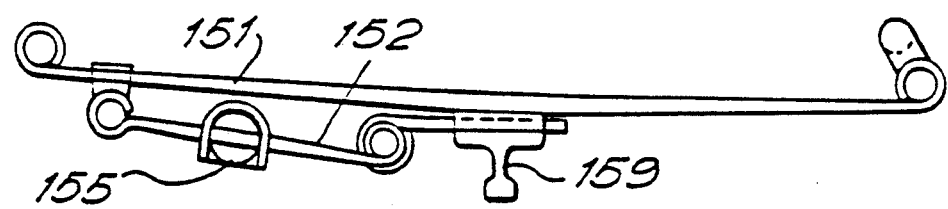
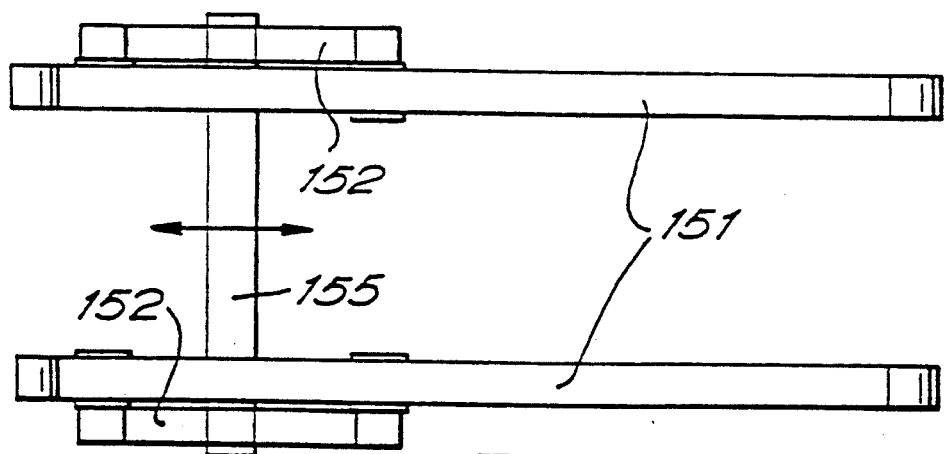
FIG. 15B.

VEHICLE SUSPENSION SYSTEM

This invention relates to a suspension system for a set of vehicle wheels, of the type including a stabiliser (anti-roll) bar or tube and is especially, but not exclusively, related to such a suspension system for heavy commercial vehicles, such as trucks, coaches, buses and plant.

In existing vehicle suspensions, it is known to use a stabiliser (anti-roll) bar or tube mounted transversely of the vehicle frame (chassis), to act in a parallel sense to an associated pair of springs (leaf springs). Such an arrangement stiffens the vehicle suspension in roll but not during total axle movement.

A typical stabiliser (anti-roll) bar or tube for, say, a truck, comprises a generally U-shaped torsion bar or tube with its otherwise free pair of ends connected to an associated axle of the truck by means of, say, shackles and with the base portion of its U connected to transversely spaced points on the vehicle frame (chassis). In the case of a torsion bar, this usually takes the form of a spring steel rod formed into the desired U-shape, although it can be of tubular construction.

Although there are several variations of this known stabiliser (anti-roll) bar or tube arrangement, such as, having the bar or tube connected between pairs of leaf springs on opposed sides of an associated vehicle, the basic purpose of the bar or tube is to resist any axle rolling movement relative to the vehicle frame (chassis) and axle, or an associated spring assembly located at or adjacent the axle, by means of shackles which allow pivoting of the respective components with respect to each other and the chassis, thereby allowing for geometrical change in the configuration of the suspension during use thereof.

It is an object of the present invention to provide an improved vehicle suspension system with enhanced anti-roll characteristics which, in turn, provide better vehicle handling, particularly under adverse driving surface conditions.

It is another object of the invention to provide an improved vehicle suspension system which affords a comparatively soft suspension during normal total axle movement but which provides a comparatively stiff anti-roll characteristic capable of resisting at least a major proportion of any roll attempted by the associated vehicle.

It is a further object of the invention to provide an improved vehicle suspension system which affords little or no anti-roll characteristic for an unladen vehicle, thereby providing a smoother and more comfortable ride, but which affords the required anti-roll characteristics when the vehicle is laden.

It is yet a further object of the invention to provide an improved vehicle suspension system which affords a comparatively soft, low frequency ride and good inter-axle articulation with comparatively high roll resistance.

Accordingly, one aspect of the invention resides in a suspension system for a vehicle wheel set, comprising first suspension means, second suspension means and stabilising means arranged generally transversely of the longitudinal axis of an associated vehicle and arranged to act in conjunction with at least one of said first and second suspension means, to provide the vehicle with an anti-roll characteristic when operating under certain conditions.

Preferably, the second suspension means is connected to, and may be mounted upon, the stabilising means. In one embodiment, the second suspension means is located on the longitudinal axis of the associated vehicle and can be secured to the chassis thereof. Preferred forms of the second suspension means include a leaf spring, coil spring, hydraulic, pneumatic or rubber (elastomeric) suspension arrangement or, indeed, any combination thereof.

In other embodiments, the first suspension means is arranged on respective opposed sides of the associated vehicle, with the stabilising means being arranged to act in conjunction with the secondary suspension means. The first suspension means may also comprise spring means arranged on respective opposed sides of the vehicle, with the stabilising means connected therebetween. Also, the stabilising means may be connected to the vehicle chassis by a pair of arms, preferably articulated with respect to the stabilising means and/or the chassis, which are arranged on respective opposed sides of, and extend generally longitudinally of, the vehicle. The end of each arm may be connected to the vehicle chassis by means of a shackle or by means of a controllable actuator of an active ride arrangement, to render the suspension system "active" or "semi-active". This arrangement of suspension system can use both powered actuators and cylinders acting as dampers and adjustable, by powered or switchable valves, from zero damping to virtually solid damping.

A preferred form of stabilising means comprises an anti-roll bar or tube whose ends may be extended or extendable to form a generally U-shaped configuration whose free ends can be secured to respective ends of an axle of the associated vehicle.

Alternatively, the stabilising means may comprise actuators attached to the vehicle chassis and in one series of embodiments, the first and second suspension means are arranged in mechanical series with each other. Other embodiments have the suspension means in parallel.

In another embodiment, the position of the stabilising means with respect to the first and second suspension means may be adjusted longitudinally of the vehicle.

In accordance with another aspect of the invention, there is provided stabiliser (anti-roll) means for use in a vehicle suspension system, consisting of a composite arrangement comprising a torsion bar or tube and a pair of leaf spring arms, one end of each arm being connected or connectable to an associated leaf spring.

Preferably, the other end of each leaf spring arm is connected or connectable to the respective end of an axle of the associated vehicle. Also, the positioning of the torsion bar or tube longitudinally of the pair of leaf spring arms may be adjustable, to facilitate "installation" of any associated suspension system in which the composite is incorporated.

Also provided is a vehicle wheel set suspension system as defined above, arranged in tandem or other multiple axle combinations thereof.

In order that the invention may be more fully understood, various embodiments in accordance therewith will now be described by way of example and with reference to the accompanying drawings in which each Figure includes a side elevational view and a plan view of a particular embodiment and wherein.

Figure 2A:
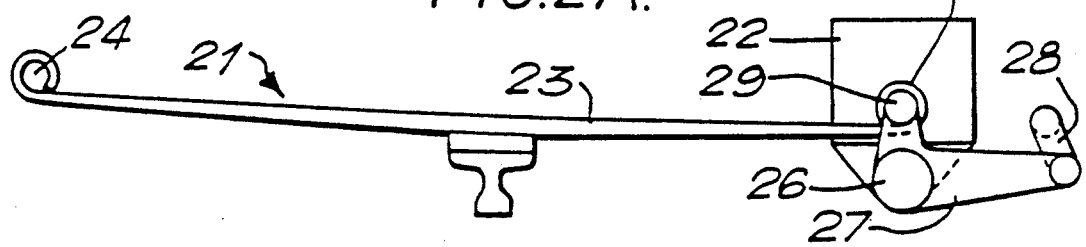
FIGS. 2A and 2B are side and top views, respectively, of a second embodiment of a vehicle wheel set suspension system in accordance with the invention.
Figure 2B:
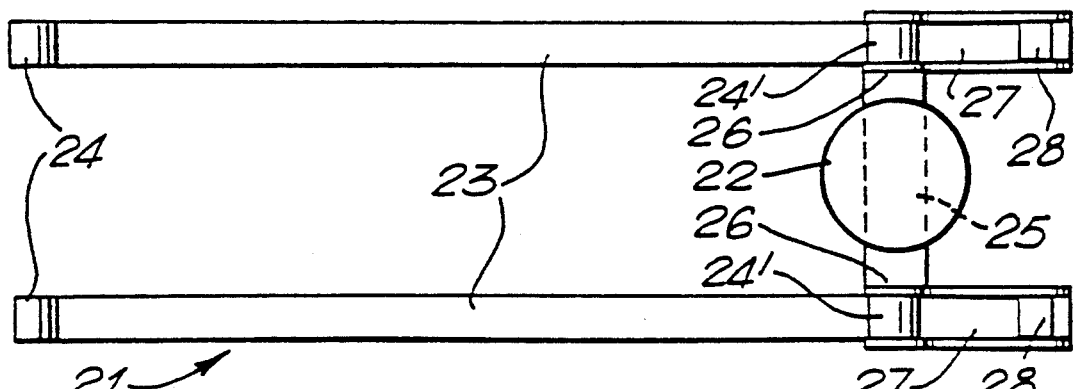
Figure 4A:
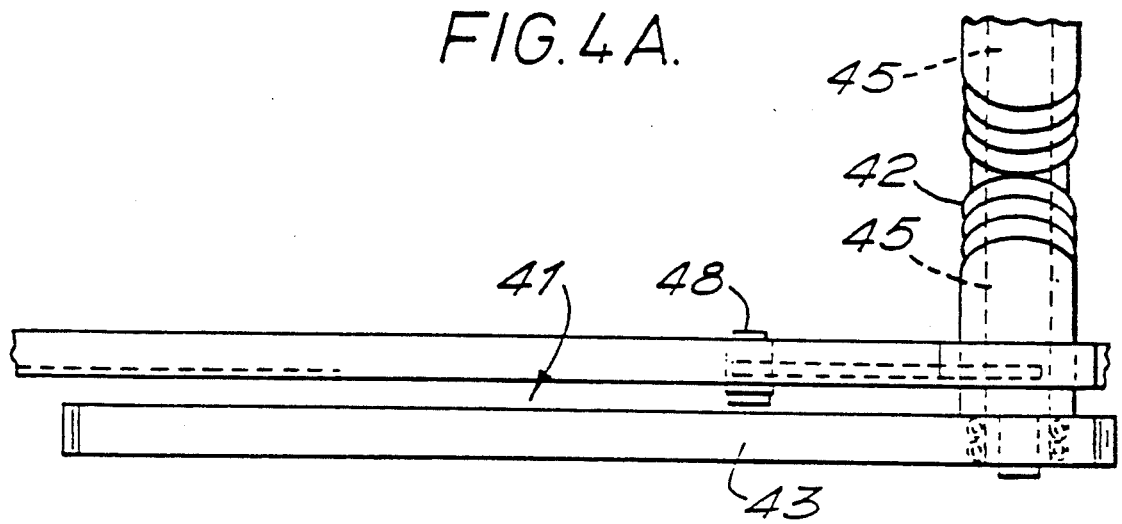
Figure 4B:
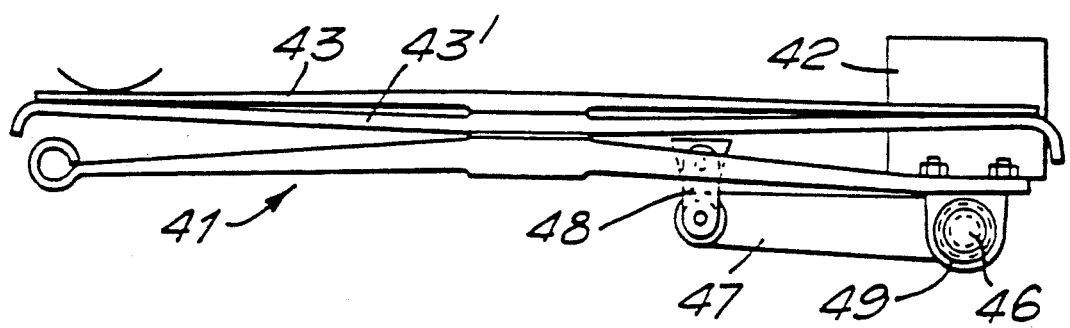
Figure 4C:
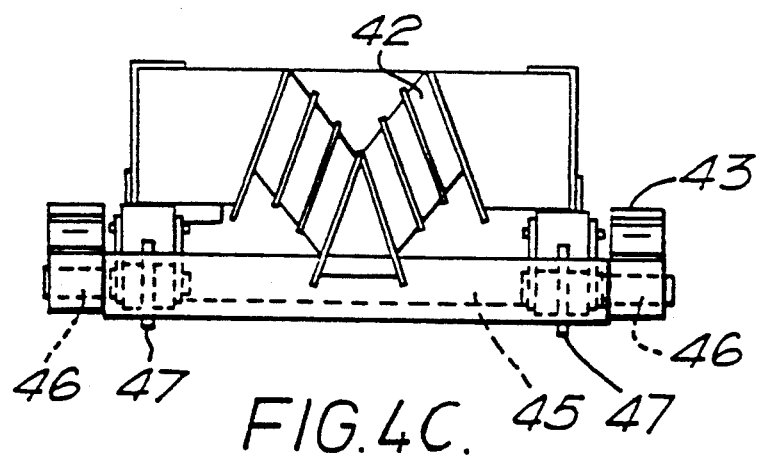
Figure 7A:
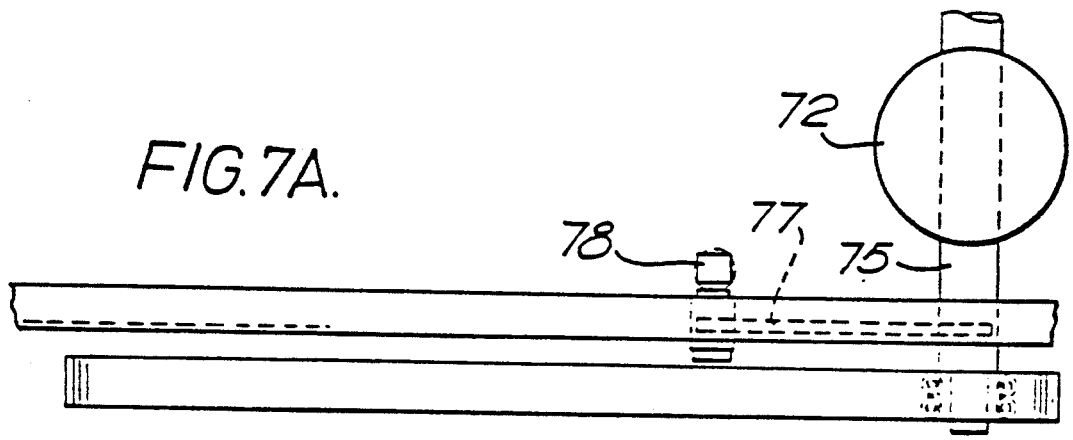
Figure 7B:
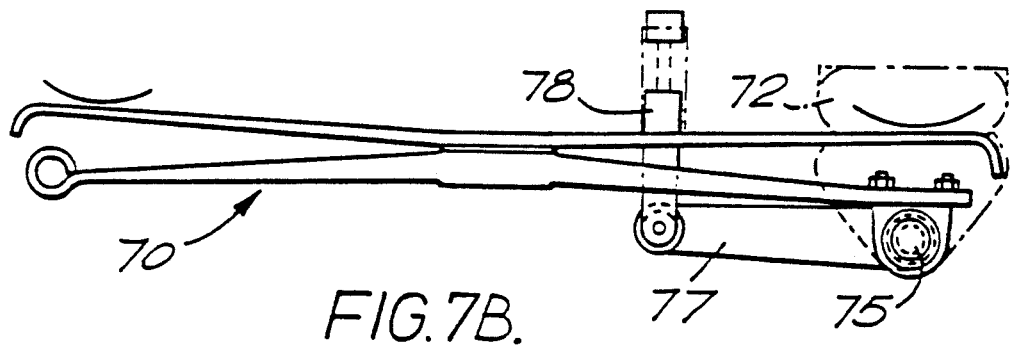
Figure 9A:
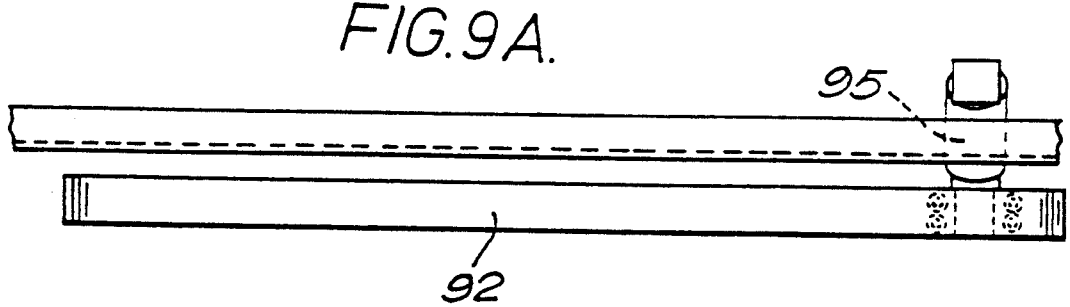
Figure 9B:
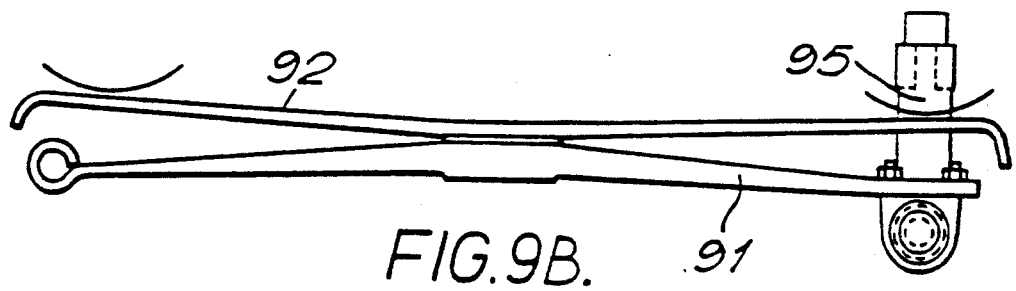
Figure 10A:
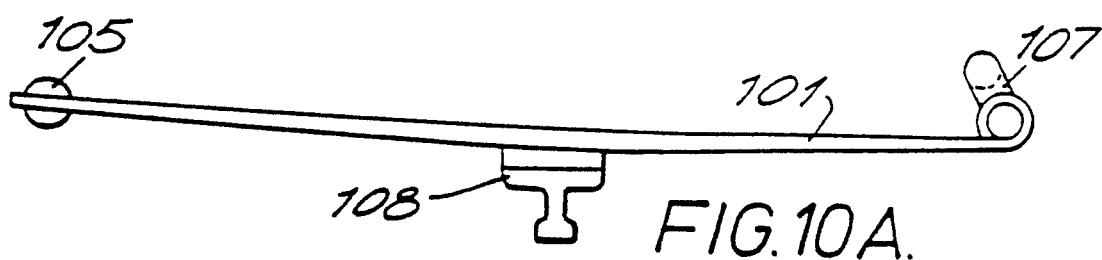
Figure 10B:
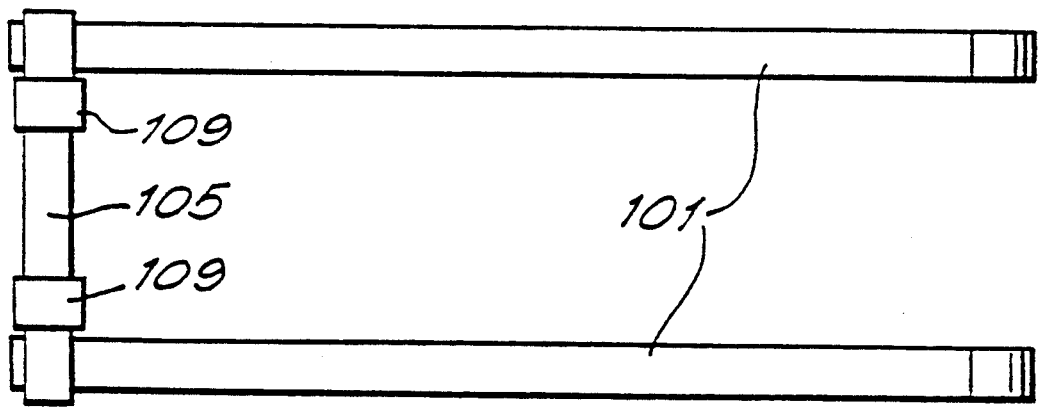
Figure 11A:
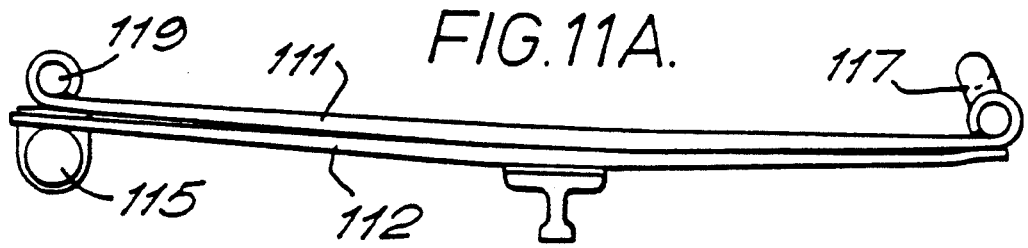
Figure 11B:
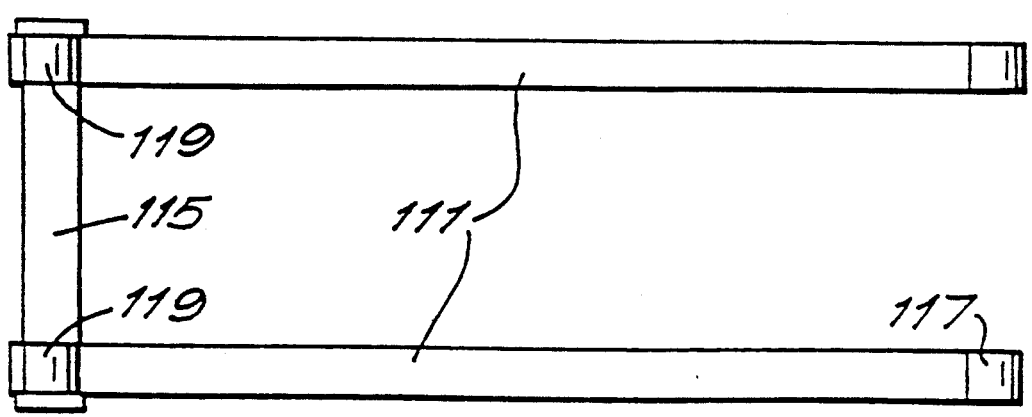
Figure 12A:
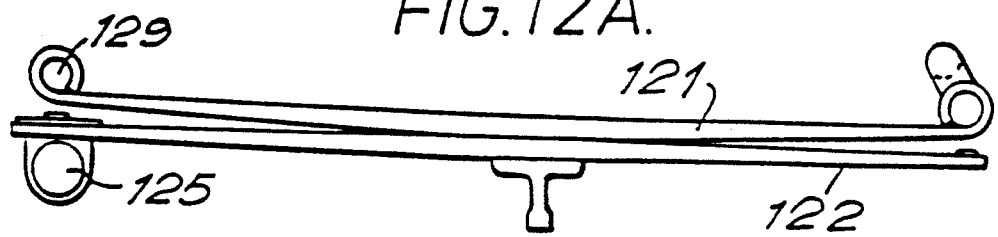
Figure 12B:
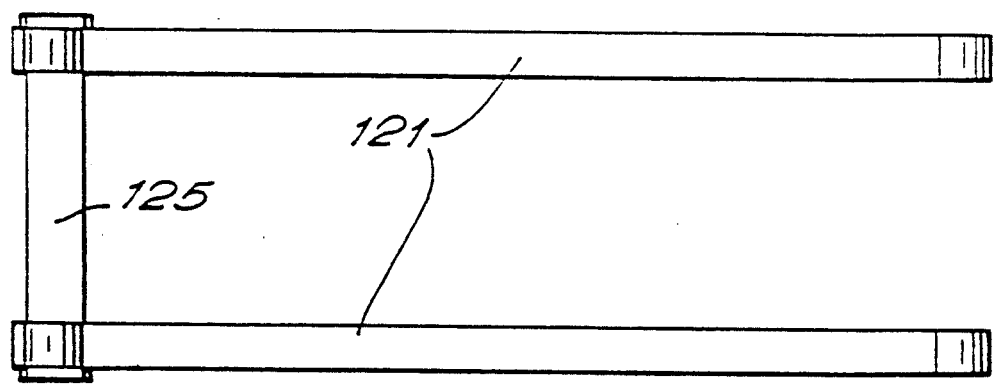
Figure 13A:
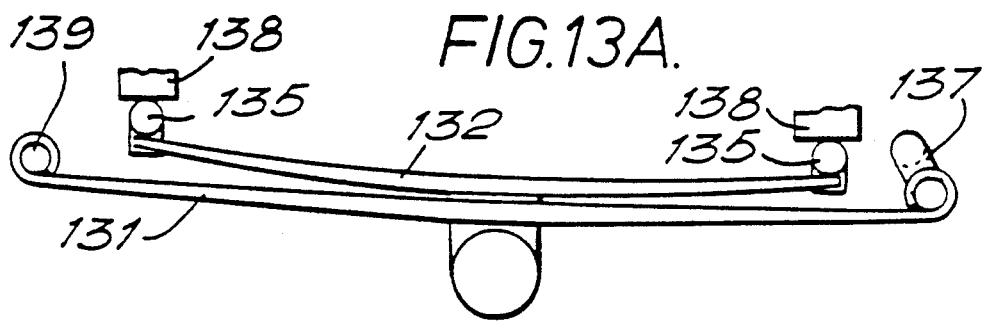
Figure 13B:
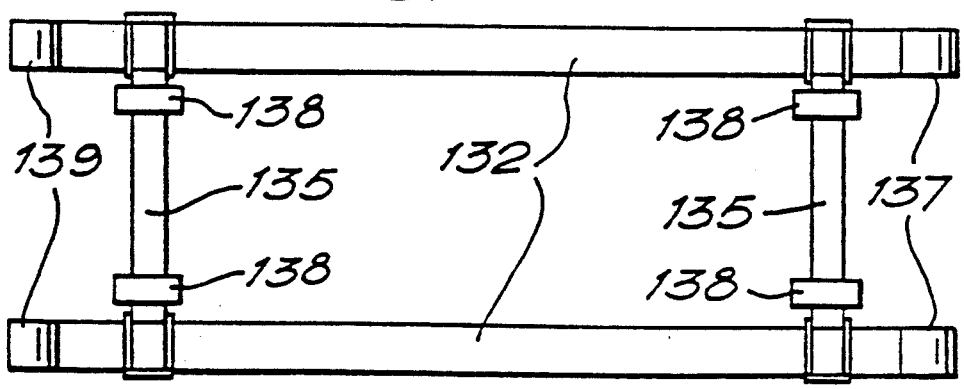

FIGS. 4A, 4B, and 4C are top, side, and end views, respectively, of a second modification of the suspension system of FIGS. 2A and 2B;

FIGS. 5A and 5B are side and top views, respectively, of a third modification of the suspension system of FIGS. 2A and 2B;

FIGS. 6A and 6B are side and top views, respectively, of a fourth modification of the suspension system of FIGS. 2A and 2B;

FIGS. 7A and 7B are top and side views, respectively, of a third embodiment of a vehicle wheel set suspension system in accordance with the invention;

FIGS. 8A and 8B are side and top views, respectively, of a modification of the suspension system of FIGS. 7A and 7B;

FIGS. 9A and 9B are top and side views, respectively, of a second modification of the suspension system of FIGS. 7A and 7B;

FIGS. 10A and 10B are side and top views, respectively, of a prior art vehicle wheel set suspension system;

FIGS. 11A and 11B are side and top views, respectively, of a fourth embodiment of a vehicle wheel set suspension system in accordance with the invention;

FIGS. 12A and 12B are side and top views, respectively, of a modification of the suspension system of FIGS. 11A and 11B;

FIGS. 13A and 13B are side and top views, respectively, of a second modification of the suspension system of FIGS. 11A and 11B;

FIGS. 14A and 14B are side and top views, respectively, of a third modification of the suspension system of FIGS. 11A and 11B; and FIGS. 15A and 15B are side and top views, respectively, of a fifth embodiment of a vehicle wheel set suspension system in accordance with another aspect of the invention.

Figure 1A:
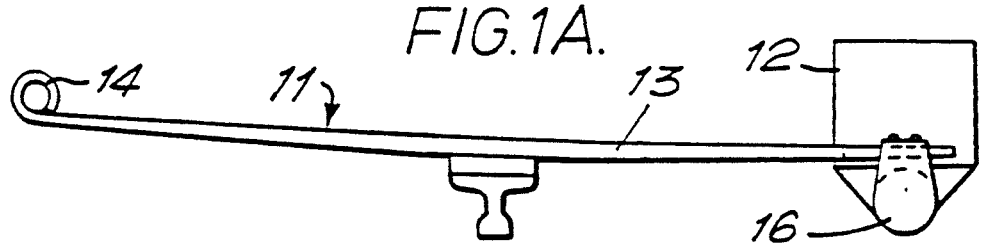
FIGS. 1A and 1B are side and top views, respectively, of a first embodiment of a suspension system for a vehicle wheel set in accordance with the invention.
Figure 1B:
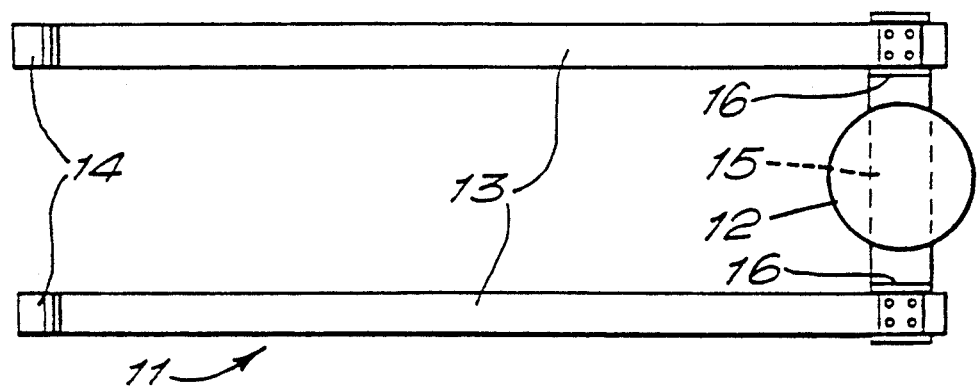

Referring firstly to FIGS. 1A and 1B of the drawings, a suspension system for a vehicle wheel set (not shown) comprises a first or primary suspension means 11 in the form of a single leaf spring 13 with an upturned eye 14 at an end thereof, such a spring 13 being mounted on either side of the frame or chassis (not shown) of an associated vehicle. A front axle wheel set suspension system is shown but, equally, the system can be associated with the rear and/or other axle wheel set of the vehicle.

A stabilising, anti-roll bar or tube 15 has its otherwise free ends 16 connected to respective ends of the leaf springs 13. Mounted upon the anti-roll bar or tube 15, centrally thereof, is secondary suspension means 12 in the form of a coil spring, pneumatic or other suitable suspension arrangement, which can be single, dual or multiple per axle and which acts between the leaf springs 13, via the anti-roll bar or tube 15, and the vehicle chassis to which it is secured. In this manner, with the primary suspension means 11 and the secondary suspension means 12 being employed in mechanical series with each other and with the anti-roll bar or tube 15 acting in conjunction with at least the primary suspension means 11, there is provided a comparatively soft suspension during normal, total axle movement but a comparatively stiff anti-roll characteristic capable of resisting at least a major proportion of any roll attempted by the vehicle.

FIGS. 2A to 6B show various forms of a second embodiment of inventive vehicle wheel set suspension system, wherein secondary suspension means is employed again in mechanical series with primary suspension means but with the stabilising means acting in conjunction with the secondary suspension means, rather than the primary suspension means as in the case of the embodiment of FIGS. 1A and 1B.

Here again, the effect is to provide a comparatively soft suspension during normal, total axle movement. The seconday suspension means, which may be in any suitable form, for instance, another leaf spring, coil spring, hydraulic, pneumatic, rubber (elastomeric) suspension arrangement or any combination thereof, is provided with a comparatively stiff, stabilising anti-roll bar or tube capable of resisting at least a major proportion of any roll attempted by the vehicle. As a consequence, the secondary suspension means, in whatever suitable form, can, if the anti-roll effect is sufficient, be installed with less consideration for spacing across the vehicle chassis to provide the necessary anti-roll characteristic. Also, the second suspension unit can be single, dual or multiple per axle.

In more detail and with reference to FIGS. 2A and 2B a first or primary suspension means 21 is constituted by a pair of leaf springs 23 disposed on opposed sides of a vehicle chassis (not shown) and having at respective ends thereof upturned eyes 24, 24', with the eyes 24 being connected to the chassis. Opposed ends 26 of an anti-roll bar or tube 25 are connected to respective arms 27 which, at one end, are connected to the chassis by associated shackles 28 and, at the other end, to the respective eyes 24' by bushes 29. Although a single leaf spring arrangement is shown for the first or primary suspension means 21, any other suitable form of leaf spring arrangement may of course be used, such as a multiple one.

Secondary suspension means in the form of, say, a coil spring 22, is mounted upon the bar or tube 25 to act in conjunction therewith.

A modified form of the second embodiment described with reference to FIGS. 2A and 2B can use a pneumatic (air) secondary suspension means, as referenced at 22, or any of the other secondary suspension means referred to above in relation to the first embodiment of FIGS. 1A and 1B.

Figure 3A:
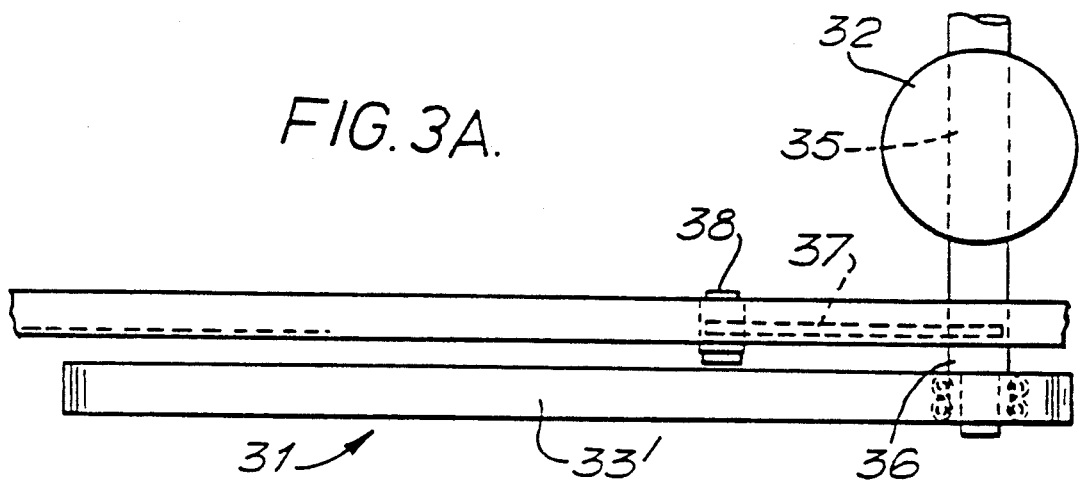
FIGS. 3A and 3B are side and top views, respectively, of a modification of the suspension system of FIGS. 2A and 2B.
Figure 3B:
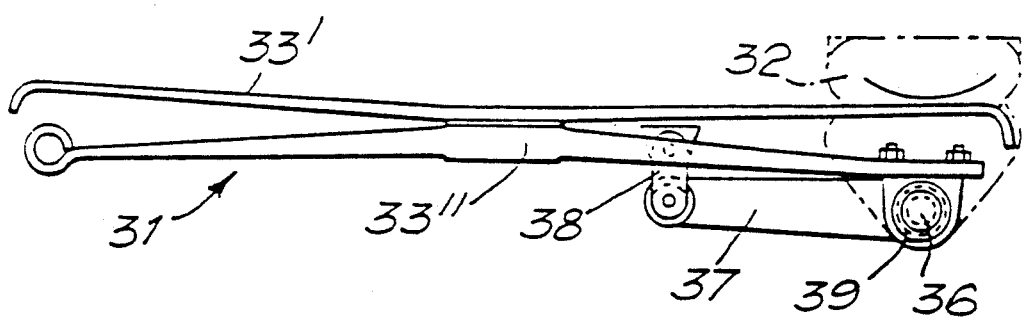

The modification shown in FIGS. 3A and 3B comprises a primary leaf spring suspension means 31 having upper leaves 33' and lower leaves 33'' with each end 36 of an anti-roll bar or tube 35 being connected by a bush 39 to each lower pair of leaves 33' of the primary suspension means 31 and to the chassis via arms 37 and shackles 38. Associated with the anti-roll bar or tube 35 is a secondary suspension means in the form of a pneumatic (air) "spring" 32.

A further modification shown in FIGS. 4A, 4B, and 4C comprises a vehicle wheel set suspension system similar to that described above in relation to FIGS. 3A and 3B, with primary leaf spring suspension means 41 having, in this case, two upper leaves 43, 43' and a single lower leaf 43'' on opposed sides of the chassis. Secondary suspension means 42 is, however, in the form of a chevron-shaped rubber suspension block 42 or rather, a pair thereof. Otherwise, the anti-roll bar or tube 45 and the other suspension components are substantially the same, namely the bushes 49 associated with the ends 46 of the bar or tube 45 the arms 47 and the shackles 48.

An extension of the various forms of the second embodiment of inventive vehicle wheel set suspension system discussed above in relation to FIGS. 2A to 4C is to couple together two axles each incorporating such a suspension system with the secondary suspension means. For example, connection between secondary, pneumatic (air) spring suspension means 52 mounted on the anti-roll bars or tubes 55, such as those shown at 22 and 32 in FIGS. 2A to 3B would give equalised or controlled loads between axles, thereby producing an effective four spring tandem suspension, as shown in FIGS. 5A and 5B. Here, this tandem arrangement comprises a pair of suspension systems each indicated generally at 50, as described above in relation to FIGS. 2A and 2B, with their secondary, pneumatic spring suspension means 52 connected together by a conduit 150, although it can be seen that the arms 57, and associated bushes 59 and shackles 58, are oriented in the opposite sense to that of the corresponding components of FIGS. 2A and 2B but in the same sense as those components of FIGS. 3A to 4C.

Such an arrangement provides a comparatively soft, low frequency ride and good inter-axle articulation with comparatively high roll resistance.

This improved axle articulation could be improved further by interconnecting, preferably hydraulically, the loads in the shackles connecting the anti-roll bars or tubes to the chassis. Such interconnection could also be effected pneumatically or mechanically. Only the same side of this tandem arrangement would be so-connected, thereby allowing each wheel on each side of the vehicle freedom to move relative to the other wheel, without anti-roll being brought into effect, whilst retaining full roll control when both wheels deflect together. Such an arrangement is shown in FIG. 6, wherein a comparatively, very high articulating four spring suspension can be produced.

In FIGS. 6A and 6B, two inventive suspension systems 60, such as, the tandem arrangement described above in relation to FIGS. 5A and 5B, have their secondary suspension means 62 connected together by a conduit 160 and their anti-roll bars or tubes 65 connected together via a hydraulic coupling 161 connected to a hydraulic piston/cylinder assembly 162 for each bar or tube 65.

By replacing the bushes and/or shackles of the anti-roll bars or tubes of the embodiments described above with valve-controlled hydraulic actuators or dampers, the suspensions could be rendered "active", with powered valves being controlled by a microprocessor fed with information relating to vehicle chassis motion.

The valves would be operated when the vehicle sprung mass required support, either to maintain the vehicle upright or to lean as required dynamically. An active suspension of this nature is shown in FIGS. 7A and 7B wherein a suspension system 70 similar to that described above in relation to FIGS. 3A and 3B is shown, except that the shackles 38 between the anti-roll arms 37, 77 and the vehicle chassis of FIGS. 3A and 3B are replaced by actuators or controlled dampers 78.

If the vehicle chassis is stable, then the actuators 78 are free or in a damped mode, so that, on one wheel bumps, they provide negligible or damped resistance to such wheel movement, thus effectively isolating the anti-roll arrangement from the vehicle. As soon as the sprung mass of the vehicle becomes subject to the influence of exterior forces, for instance, a strong side wind or camber, the actuator or controlled damper 78 is brought into operation or the damper setting is changed and, in conjunction with the secondary suspension means 72 and the anti-roll bar or tube 75, acts to support the vehicle, thereby providing high dynamic stability. Thus, this active suspension does not bear loads under steady state operation, which is in contrast to known active systems which act directly upon the wheel(s). Accordingly, the inventive active suspension system 70 has an advantage over the normal active ride suspension systems, in that its response and sophistication need not be as sensitive as the known systems which act directly upon the wheel(s). Also, the system could be more failsafe for longer term durability situations.

FIGS. 8A and 8B show such an active suspension of the tandem type, which is similar to the suspension described above in relation to FIGS. 6A and 6B, with control lines 181 connecting actuators 182 together. These actuators 182 are associated with the arms 87 of the anti-roll bars or tubes 85 connected between the leaf springs 83 of primary suspension means 81 and bearing secondary suspension means 82. Also, further control lines 183 link the control lines 181 to microprocessor-controlled valves (not shown) with a conduit 180 linking the two secondary suspension means 82 together.

FIGS. 9A and 9B shows a modification of the active suspensions described above with reference to FIGS. 7A to 8B, wherein the anti-roll bar or tube is replaced by other stabilising (anti-roll) means in the form of actuators 95 which are linked directly to the vehicle chassis and which simulate the action of an anti-roll bar or tube and secondary suspension means. The primary suspension means is represented here by respective lower and upper leaf springs 91, 92, to the former of which the actuators 95 are attached.

In FIGS. 10A and 10B, a prior art arrangement of vehicle suspension system 110 is shown with an anti-roll bar or tube 105 connected between either or both pairs of ends of the two leaf springs 101 but with only one anti-roll bar 105 being employed in this particular known system. The anti-roll bar or tube 105 is mounted at 109 to the vehicle chassis (also not shown) by means of bushes, whilst the remote ends of the spring leaves 101 are also connected to the chassis by shackles 107. In some circumstances, this mounting arrangement for the anti-roll bars or tubes 105 would provide enhanced mounting points for chassis brackets and would tend to reduce any bending moments in chassis cross-members.

When both the springs 101 move to the same angular extend (deflection) during, say, total movement of the axle 108, the spring deflection and rate would be generally that of any other conventional spring. When one spring moves in a direction opposite to that of the other, for instance, during roll of the vehicle, then the anti-roll bar or tube 105 is in torsion, resisting such movement of the spring 101. If the anti-roll bar or tube 105 is considered to be infinitely stiff and the spring movements are considered to be similar but in opposite directions, then the spring would deflect as if its end were "encastre", thereby giving up to four times the normal stiffness in the associated part of the spring. Such an arrangement could provide enhanced spring mounting, especially for composite leaf springs wherein problems arise with eye mounting arrangements, as well as eliminating the conventional anti-roll bar arrangements.

In FIGS. 10A and 10B, single leaf springs 101 are shown. However, and as shown in FIGS. 11A and 11B, multiple suspension means in the form of double leaved springs can be used in accordance with the invention. In this fourth embodiment, two leaf springs 111 and 112, consituting respective primary and secondary suspension means, are used. An anti-roll bar or tube 115 is connected to the ends of the secondary lower leaf spring 112, whilst the primary upper leaf spring 111 is connected to the vehicle chassis in a conventional manner by means of, say, bushes 119 and/or shackles 117. This means, of course, that the anti-roll bar or tube 115 need not be connected directly to the chassis, thereby eliminating any need for associated bushes or chassis brackets, with the springs 111 and 112 in parallel.

The roll stiffening effect of this inventive arrangement would be lower than that for a single leaf spring arrangement but the required extra roll stability could still be obtained.

In a modified form of this fourth embodiment of the inventive suspension system shown in FIGS. 12A and 12B an anti-roll bar or tube 125 is connected between the ends of a secondary lower, full length auxiliary leaf 122, whilst the primary upper leaf 121 is connected to the vehicle chassis in a conventional manner with bushes 129 and shackles 127. One advantage of this modified arrangement is that the anti-roll effect only comes into operation when the secondary suspension, auxiliary leaf 122 is in operation. Thus, an unladen vehicle would not be subject to any anti-roll effect, because the auxiliary leaf 122 is not operating, such an effect not normally being required for an unladen vehicle. This would, of course, give a smoother and more comfortable ride, because the one wheel bump condition is free from any anti-roll resistance. Under laden conditions of the vehicle, however, the auxiliary leaf 122 becomes effective, thereby providing the required anti-roll characteristic in conjunction with the anti-roll bar or tube 125. If necessary, the auxiliary leaf 122 and associated ends of the anti-roll bar or tube 125 could be made to act directly on to the vehicle chassis.

FIGS. 13A to 14B shown two further modifications of the fourth embodiment, wherein the primary lower, auxiliary leaf 131, in FIGS. 13A and 13B is secured to the chassis via bushes 139 and shackles 137 and to the secondary, upper leaf 132, with anti-roll bars or tubes 135 connected between both ends of the pair of upper leaves 132 and to the chassis at respective points 138. This arrangement would require a comparatively large clearance in the vehicle frame (chassis) to permit free movement of the bar or tube 135.

In the FIGS. 14A and 14B modification, two anti-roll bars or tubes 145 are again connected between respective ends of a pair of secondary suspension, upper leaf springs 142 of the system, these bars or tubes being secured to the vehicle chassis by means of flexible mounting members 148, with primary suspension, lower leaf springs 141 being separated from but free to engage the centre of the upper leaf springs 142. Again, the primary lower leaf springs 141 are connected to the chassis via bushes 149 and shackles 147.

Referring now to FIGS. 15A and 15B of the drawings, here there is shown stabilising means for a vehicle suspension in accordance with a second aspect of the invention which could be considered as constituting a fifth embodiment of the first aspect of the invention relating to a vehicle wheel set suspension system.

In this so-called fifth embodiment, first suspension means is provided in the form of a single leaf spring 151 and second suspension means which acts only in an anti-roll sense and which is in the form of an auxiliary leaf spring arm 152, a pair of such first and second suspension means being located on each side of the associated vehicle. In this case, a composite anti-roll bar or tube 155 in the form of a thin-walled tube and the leaf spring arm 152 is provided. One end of each arm 152 is connected to the leaf spring 151, whilst the other end is connected to the respective end of the axle 159 in the usual manner.

In this fifth embodiment, in accordance with the other aspect of the invention, the major proportion of anti-roll (stabilising) deflection is provided by the spans of the leaf spring arms 152 and "tuning" can be effected by changing the leaves of the arms 152 to suit. Also, the position of the anti-roll bar tube 155 is adjustable along the length of the leaf spring arms 152. Thus, the arrangement and configuration of the anti-roll tube 155 and the leaf spring arms 152 can be altered to provide a parallelogram geometry under most working conditions of the suspension and/or to suit vehicle component installation clearances for, say, engines, radiators, the axle differential housing or the like.

Thus, it can be seen that the invention provides various vehicle wheel set suspension systems which are capable of improving the anti-roll characteristic of a vehicle. Also, it is to be appreciated that various modifications can be made to the inventive suspension systems described herein, without departing from the basic concept of the invention as defined in the appendant claims.

I claim:

1. A suspension system for a vehicle wheel set having an axle, comprising first, leaf spring suspension means arranged on opposed sides of an associated vehicle and connected to the axle by mountings located generally centrally thereof in the longitudinal direction of the vehicle and second suspension means which is arranged in mechanical series with said first, leaf spring suspension means and is connected to stabilishing means arranged generally transversely of the longitudinal axis of the vehicle and arranged to act in conjunction therewith, to provide the vehicle with an anti-roll characteristic when operating under certain conditions.

2. A suspension system according to claim 1, wherein said second suspension means is mounted upon said stabilising means.

3. A suspension system according to claim 1, wherein said second suspension means is located on the longitudinal axis of the associated vehicle.

4. A suspension system according to claim 1, wherein said second suspension means is secured to the chassis of the associated vehicle.

5. A suspension system according to claim 1, wherein said second suspension means comprises a leaf spring, coil spring, hydraulic, pneumatic or rubber (elastomeric) suspension arrangement or any combination thereof.

6. A suspension system according to claim 1 wherein said stabilising means is connected between said first, leaf spring suspension means on opposed sides of the vehicle.

7. A suspension system according to claim 1, wherein said stabilising means is connected to the vehicle chassis by means of a pair of arms arranged on respective opposed sides of, and extending generally longitudinally of, the vehicle.

8. A suspension system according to claim 7 wherein an end of each arm is connected to the vehicle chassis by means of a shackle.

9. A suspension system according to claim 7 wherein an end of each arm is connected to the vehicle chassis by means of a controllable actuator, or damper to render the system "active" or "semi-active".

10. A suspension system according to claim 1, wherein said stabilising means comprises an anti-roll bar or tube.

11. A suspension system according to claim 1, wherein said stabilising means comprises actuators attached to the vehicle chassis.

12. A suspension system according to claim 1 wherein the position of said stabilising means with respect to said first and second suspension means is adjustable longitudinally of the vehicle.

13. A vehicle having a wheel set incorporating a suspension system according to claim 1.

14. A suspension system for a vehicle wheel set, comprising first and second leaf spring suspension means each arranged on opposed sides of any associated vehicle and being arranged in mechanical parallel with each other, and stabilising means which is arranged generally transversely of the longitudinal axis of the vehicle and to which said second suspension means is connected to act in conjunction therewith, to provide the vehicle with an anti-roll characteristic when operating under certain conditions, said first and second leaf spring suspension means having common axle mountings located generally centrally thereof in the longitudinal direction of the vehicle.

15. A suspension system according to claim 14, wherein said stabilising means comprises an anti-roll bar or tube whose ends are extended or extendable to form a generally U-shaped anti-roll bar or tube and are secured to respective ends of an axle of the associated vehicle.

16. A suspension system according to claim 14, wherein the anti-roll bar or tube consists of a composite arrangement comprising a torsion bar or tube and a pair of leaf spring arms constituting said second suspension means.

17. A suspension system according to 14 wherein the position of said stabilising means with respect to said first and second suspension means is adjustable longitudinally of the vehicle.

18. A vehicle having a wheel set incorporating a suspension system according to claim 14.

19. Two or more vehicle wheel set suspension systems according to claim 14 arranged in tandem or multiple axle combinations thereof.

20. Stabilising, anti-roll means for a vehicle wheel set suspension system consisting of a composite arrangement comprising a torsion bar or tube and a pair of leaf spring arms, wherein one end of each leaf spring arm is connected or is connectable to associated suspension means and the other end of each arm is connected or is connectable to the respective end of an axle of an associated vehicle, the torsion bar or tube being adjustable longitudinally of the pair of leaf spring arms.

21. A vehicle wheel set suspension system incorporating stabilising, anti-roll means according to claim 20.

22. Two or more vehicle wheel set suspension systems according to any of claim 20 arranged in tandem or multiple axle combinations thereof.

* * * * *